United States Patent
Lai

(10) Patent No.: US 9,836,172 B2
(45) Date of Patent: Dec. 5, 2017

(54) TOUCH APPARATUS, CAPACITIVE TOUCH SENSING CIRCUIT THEREOF, AND TOUCH SENSING METHOD USING THE SAME

(71) Applicant: FocalTech Electronics, Ltd

(72) Inventor: Yao-Hung Lai, Taichung (TW)

(73) Assignee: FocalTech Electronics, Ltd., Grand Cayman (KY)

( * ) Notice: Subject to any disclaimer, the term of this patent is extended or adjusted under 35 U.S.C. 154(b) by 45 days.

(21) Appl. No.: 15/016,209

(22) Filed: Feb. 4, 2016

(65) Prior Publication Data

US 2017/0131807 A1    May 11, 2017

(30) Foreign Application Priority Data

Nov. 11, 2015    (TW) .............. 104137107 A

(51) Int. Cl.
*G06F 3/041*    (2006.01)
*G06F 3/044*    (2006.01)

(52) U.S. Cl.
CPC ............ *G06F 3/044* (2013.01); *G06F 3/0416* (2013.01)

(58) Field of Classification Search
CPC ................ G06F 3/0416; G06F 3/044
See application file for complete search history.

(56) References Cited

U.S. PATENT DOCUMENTS

| | | |
|---|---|---|
| 8,022,714 B2 | 9/2011 | Bartling |
| 8,547,114 B2 | 10/2013 | Kremin |
| 8,810,263 B1 | 8/2014 | Wilson et al. |
| 8,884,909 B2 | 11/2014 | Huang et al. |
| 9,019,229 B2 | 4/2015 | Guedon et al. |
| 2014/0176482 A1 | 6/2014 | Wei et al. |

FOREIGN PATENT DOCUMENTS

| | | | |
|---|---|---|---|
| CN | 1797309 A | * | 7/2006 |
| CN | 1797309 A | | 7/2006 |
| TW | 200715175 A | | 4/2007 |
| TW | 201100814 A | | 1/2011 |

OTHER PUBLICATIONS

"Office Action of Taiwan Counterpart Application", dated Jul. 21, 2016, p. 1-p. 10.

* cited by examiner

*Primary Examiner* — Charles Hicks
(74) *Attorney, Agent, or Firm* — JCIPRNET

(57) ABSTRACT

A touch apparatus, a capacitive touch sensing circuit of the touch apparatus, and a touch sensing method are provided. The capacitive touch sensing circuit includes a switching capacitor integrating circuit, an encoding circuit, a feedback circuit, and a decoding circuit. The switching capacitor integrating circuit receives an input signal and integrates the input signal to generate an output signal. The encoding circuit receives and encodes the output signal to generate an encoded result. The feedback circuit provides a charge dissipation path for discharging charges from the switching capacitor integrating circuit, and the feedback circuit receives the encoded result and adjusts a charge dissipation ability provided by the charge dissipation path according to the encoded result. The decoding circuit receives and decodes the output signal to generate a touch detecting result.

17 Claims, 6 Drawing Sheets

TOUCH APPARATUS, CAPACITIVE TOUCH SENSING CIRCUIT THEREOF, AND TOUCH SENSING METHOD USING THE SAME

CROSS-REFERENCE TO RELATED APPLICATION

This application claims the priority benefit of Taiwan application serial no. 104137107, filed on Nov. 11, 2015. The entirety of the above-mentioned patent application is hereby incorporated by reference herein and made a part of this specification.

Field of Invention

The invention relates to a capacitive touch sensing circuit, and more particularly, to a 1-bit sigma delta capacitive touch sensing circuit.

Description of Related Art

With the popularity of electronic products, a well-functioned human-machine interface has become indispensible in every electronic apparatus, and capacitive touch panels are commonly applied in the existing electronic apparatuses.

According to the related art, equipping the capacitive touch panel with a 1-bit sigma delta capacitive touch sensing circuit has been proposed, so as to perform touch sensing actions. In terms of the dimension of the circuit, the power consumption, or the immunity to noise interference, the 1-bit sigma delta capacitive touch sensing circuit is superior to the conventional analog-to-digital touch sensing circuit. However, since the 1-bit sigma delta capacitive touch sensing circuit provides the feedback circuit with constant charge dissipation according to the related art, the 1-bit sigma delta capacitive touch sensing circuit cannot guarantee both of the high resolution and the large detectable range while detecting variations of capacitance, thus lessening the efficiency.

SUMMARY

The present invention is directed to a capacitive touch sensing circuit and sensing method thereof, which are able to effectively increase the sensing resolution and the detectable range while variations of capacitance are being detected.

The present invention is further directed to a touch apparatus using the capacitive sensing circuit and the touch sensing method of the capacitive touch sensing circuit, so as to effectively increase the sensitivity and the detectable range while variations of capacitance are being detected.

In an embodiment of the present invention, a capacitive touch sensing circuit that includes a switching capacitor integrating circuit, an encoding circuit, a feedback circuit, and a decoding circuit is provided. The switching capacitor integrating circuit is coupled to a to-be-tested capacitive touch unit that receives an input signal, and the switching capacitor integrating circuit integrates the input signal to generate an output signal. The encoding circuit is coupled to the switching capacitor integrating circuit to receive the output signal and encode the output signal to generate an encoded result. The feedback circuit is coupled to the switching capacitor integrating circuit and the encoding circuit and provides the switching capacitor integrating circuit with a charge dissipation path for discharging charges from the switching capacitor integrating circuit, and the feedback circuit receives the encoded result and adjusts a charge dissipation ability provided by the charge dissipation path according to the encoded result. The encoding circuit is coupled to the switching capacitor integrating circuit to receive the output signal and decode the output signal to generate a touch detecting result.

In an embodiment of the present invention, a touch display apparatus includes a display panel and at least one capacitive touch sensing circuit described above. The touch panel includes a plurality of capacitive touch units. The at least one capacitive touch sensing circuit is coupled to the to-be-tested capacitive touch unit of one of the capacitive touch units.

In an embodiment of the present invention, a capacitive touch sensing method includes: receiving an input signal by a to-be-tested capacitive touch unit, providing a switching capacitor integrating circuit, and integrating the input signal by the switching capacitor integrating circuit, so as to generate an output signal; encoding the output signal to generate an encoded result; providing the switching capacitor integrating circuit with a charge dissipation path for discharging charges from the switching capacitor integrating circuit and adjusting a charge dissipation ability provided by the charge dissipation path according to the encoded result; decoding the output signal to generate a touch detecting result.

In view of the above, the encoding circuit provided herein encodes the output signal and thereby generates the encoded result. The charge dissipation ability of the charge dissipation path provided by the feedback circuit can be dynamically adjusted according to the encoded result. That is, the charge dissipation mechanism provided herein can be dynamically adjusted in response to the load current, and the capacitive touch sensing circuit can detect minor variations in the capacitance even in case of significant transfer capacitance; as such, the requirements for highly sensing resolution and large detectable range can be satisfied.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1:
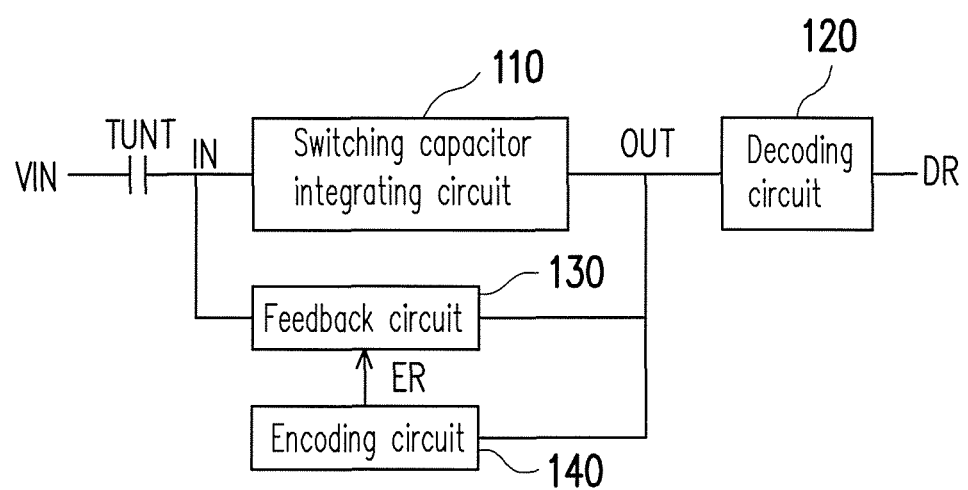
FIG. 1 is a schematic view illustrating a capacitive touch sensing circuit according to an embodiment of the present invention.

FIG. 1 is a schematic view illustrating a capacitive touch sensing circuit according to an embodiment of the present invention. The capacitive touch sensing circuit 100 includes a switching capacitor integrating circuit 110, a decoding circuit 120, a feedback circuit 130, and an encoding circuit 140. The switching capacitor integrating circuit 110 is coupled to one terminal of a to-be-tested capacitive touch unit TUNT. The other terminal of the to-be-tested capacitive touch unit TUNT receives a signal VIN. When a touch detecting action is performed on the to-be-tested capacitive touch unit TUNT, the signal VIN may be a clock signal, and the to-be-tested capacitive touch unit TUNT may generate an input signal IN and provide the input signal IN to the switching capacitor integrating circuit 110. The switching capacitor integrating circuit 110 integrates the input signal IN received by the switching capacitor integrating circuit 110, so as to generate an output signal OUT.

In the present embodiment, the capacitance of the to-be-tested capacitive touch unit TUNT may be changed according to whether the to-be-tested capacitive touch unit TUNT is touched or not, and the input signal IN may also be changed in response to variations in the capacitance of the to-be-tested capacitive touch unit TUNT. Since the switching capacitor integrating circuit 110 integrates the input signal IN, the integrated result can effectively reflect the changes to the input signal IN, and whether the to-be-tested capacitive touch unit TUNT is touched or not can be determined according to the integrated result. On the other hand, the switching capacitor integrating circuit 110 may determine a reference voltage and compare the integrated result with the reference voltage, so as to generate the output signal OUT. In an embodiment of the present invention, the output signal OUT may be a digital signal, and a voltage level of the output signal OUT may stay unchanged or may be different in a plurality of continuous time cycles.

The encoding circuit 140 is coupled to the switching capacitor integrating circuit 110 and receives the output signal OUT. The encoding circuit 140 encodes the output signal OUT to generate an encoded result ER. The encoding circuit 140 may sequentially generate the encoded result ER in a plurality of time cycles according to variations in a voltage of the output signal OUT in two successive time cycles. Particularly, the encoding circuit 140 may determine whether a logic level of the voltage of the output signal OUT remains constant (i.e., logic high or logic low in both time cycles); if yes, the encoding circuit 140 gradually increases the encoded result ER by 1. By contrast, if the logic level of the voltage of the output signal OUT is switched from high to low or from low to high in the two successive time cycles, the encoding circuit 140 gradually decreases the encoded result ER by 1. For instance, if the high logic levels of the output signal OUT in plural successive time cycles are sequentially 1, 1, 1, 1, 0, 1, and 0, the encoded results ER generated by the encoding circuit 140 are sequentially 0, 1, 2, 3, 2, 1, and 0 (the default value is 0). Here, the minimum encoded result ER is 0.

The feedback circuit 130 is coupled to the switching capacitor integrating circuit 110 and the encoding circuit 140. The feedback circuit 130 provides the switching capacitor integrating circuit 110 with a charge dissipation path for discharging charges from the switching capacitor integrating circuit 110. Here, the feedback circuit 130 receives the encoded result ER and adjusts a charge dissipation ability provided by the charge dissipation path according to the encoded result ER. The feedback circuit 130 also receives the output signal OUT and determines to perform the charging action or the discharging action according to the output signal OUT.

In the present embodiment, the feedback circuit 130 can adjust the charge dissipation ability of the charge dissipation path provided to the switching capacitor integrating circuit 110 according to the encoded result ER. If the encoded result ER is a 3-bit numeral value, the feedback circuit 130 is able to offer eight ($2^3$) different charge dissipation abilities. If the charge dissipation ability provided by the feedback circuit 130 is rather small, the sensing resolution of the capacitive touch sensing circuit 100 can be enhanced; if the charge dissipation ability provided by the feedback circuit 130 is rather large, the capacitive touch sensing circuit 100 can expand its detectable range of variations in the capacitance.

The decoding circuit 120 is coupled to the switching capacitor integrating circuit 110. The decoding circuit 120 receives the output signal OUT and decodes the output signal OUT to generate a touch detecting result DR. In detail, the decoding circuit 120 sequentially generates a plurality of numeral values in a plurality of time cycles according to variations in a voltage of the output signal OUT in two successive time cycles and obtains the touch detecting result DR through adding up the numeral values.

In light of the foregoing, the feedback circuit 130 of the capacitive touch sensing circuit 100 can adjust the charge dissipation ability of the provided charge dissipation path according to the output signal OUT generated by the switching capacitor integrating circuit 110. The capacitive touch sensing circuit 100 can, according to its operating conditions, make necessary modifications to satisfy the requirements for high resolution and the large detectable range, respectively, so as to optimize the performance of the capacitive touch sensing circuit 100.

Figure 2:
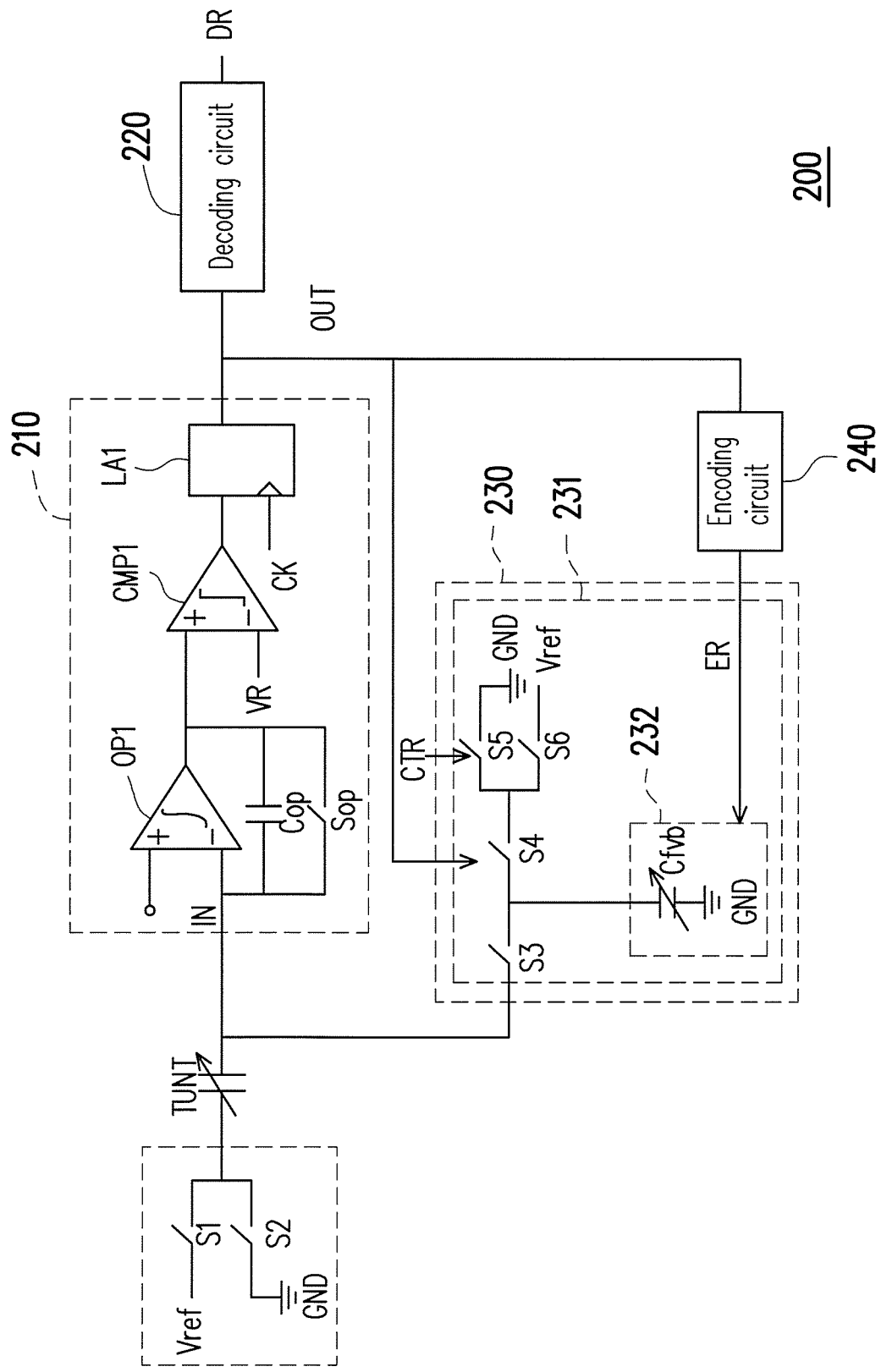
FIG. 2 is a schematic view illustrating a capacitive touch sensing circuit according to another embodiment of the present invention.

FIG. 2 is a schematic view illustrating a capacitive touch sensing circuit according to another embodiment of the present invention. The capacitive touch sensing circuit 200 includes a switching capacitor integrating circuit 210, a decoding circuit 220, a feedback circuit 230, and an encoding circuit 240. The switching capacitor integrating circuit 210 is coupled to a capacitive touch unit TUNT. In the present embodiment, the capacitive touch unit TUNT receives a signal VIN generated by alternately switching on or off switches S1 and S2, and an input signal IN is correspondingly generated. The signal VIN may be a periodic signal transiting between a voltage of a reference ground terminal GND and a reference voltage Vref.

The switching capacitor integrating circuit 210 includes an operational amplifier OP1, a capacitor Cop, a switch Sop, a comparator CMP1, and a latch LA1. The operational amplifier OP1 receives the input signal IN and integrates the input signal IN through the switch Sop and the capacitor Cop. An integrated result is generated by an output terminal of the operational amplifier OP1 and transmitted to the comparator CMP1. The comparator CMP1 compares the integrated result with a reference signal VR to generate a comparison result, and the latch LA latches the comparison result generated by the comparator CMP1, so as to generate an output signal OUT. The latch LA performs the data latching action according to a clock signal CK.

The output signal OUT is transmitted to the decoding circuit 220, the encoding circuit 240, and the feedback circuit 230. The decoding circuit 220 receives the output signal OUT and accordingly generates a detecting result DR. The encoding circuit 240 receives the output signal OUT and encodes the output signal OUT to generate an encoded result ER.

The feedback circuit 230 includes a switching capacitive circuit 231. The switching capacitive circuit 231 receives the output signal OUT, and a first terminal of the switching capacitive circuit 231 is coupled to an end point of the switching capacitor integrating circuit 210 receiving the input signal IN. The switching capacitive circuit 230 includes a weighted capacitance adjuster 232. The weighted capacitance adjuster 232 provides a capacitance Cfbv that can be adjusted according to the encoded result ER.

Based on the capacitance Cfbv provided by the weighted capacitance adjuster 232, the charge dissipation ability of the charge dissipation path provided by the feedback circuit 230 can be adjusted, and the capacitive touch sensing circuit 200 can satisfy the requirements for both the highly sensing resolution and the large detectable range of variations of the capacitance.

As to other details of the switching capacitive circuit 231, the switching capacitive circuit 231 further includes switches S3, S4, S5, and S6. A first terminal of the switch S3 receives the input signal IN, and a second terminal of the switch S3 is coupled to a first terminal of the switch S4. A second terminal of the switch S4 is coupled to a first terminal of the switch S5 and a first terminal of the switch S6, and a second terminal of the switch S5 and a second terminal of the switch S6 are respectively coupled to the reference ground terminal GND and the reference voltage Vref. The weighted capacitance adjuster 312 is serially coupled between the second terminal of the switch S4 and the reference ground terminal GND. The switches S5 and S6 may be switched on or off according to the same control signal, and the switches S3 and S4 are switched on or off according to the output signal OUT. While the switch S3 is switched on, the switch S4 is switched off, and vice versa.

In the present embodiment, the switches S5 and S6 may controlled by the control signal CTR and may thus be switched on or off, and the switches S3 and S4 are switched on or off according to the output signal OUT. While the switch S3 is switched on, the switch S4 is switched off, and vice versa. If the switch S4 is controlled by the output signal OUT and is switched on, the feedback circuit 230 provides the switching capacitor integrating circuit 210 with a charge dissipation path for discharging charges from the switching capacitor integrating circuit 210.

In detail, the decoding circuit 220 sequentially generates a plurality of numeral values in a plurality of time cycles according to variations in a voltage of the output signal OUT in two successive time cycles and obtains the touch detecting result DR through adding up the numeral values.

The encoding circuit 240 sequentially generates the encoded result ER in a plurality of time cycles according to variations in a voltage of the output signal OUT in two successive time cycles. Particularly, the encoding circuit 240 may determine whether a logic level of the voltage of the output signal OUT remains constant; if yes, the encoding circuit 240 gradually increases the encoded result ER by 1. By contrast, if the logic level of the voltage of the output signal OUT is switched from high to low or from low to high in the two successive time cycles, the encoding circuit 240 gradually decreases the encoded result ER by 1.

Note that the decoding circuit 220 and the encoding circuit 240 can both be implemented in form of a digital circuit. That is, according to the aforesaid principles of circuit operations, the decoding circuit 220 and the encoding circuit 240 can be implemented in form of any digital design commonly known to people having ordinary skill in the pertinent art, such as a hardware description language (HDL), a conventional truth table, a Karnaugh map, a Mealy finite state machine or a Moore finite state machine, and so on. Hence, the decoding circuit 220 and the encoding circuit 240 do not have any fixed configuration. If the decoding circuit 220 and the encoding circuit 240 are implemented in form of HDL, the database of the circuit synthesizer software and the basic logic gate of the circuit employed by the designer determine the type and the number of logic gates in the circuit, and the type and the number of logic gates may not remain constant.

Figure 3:
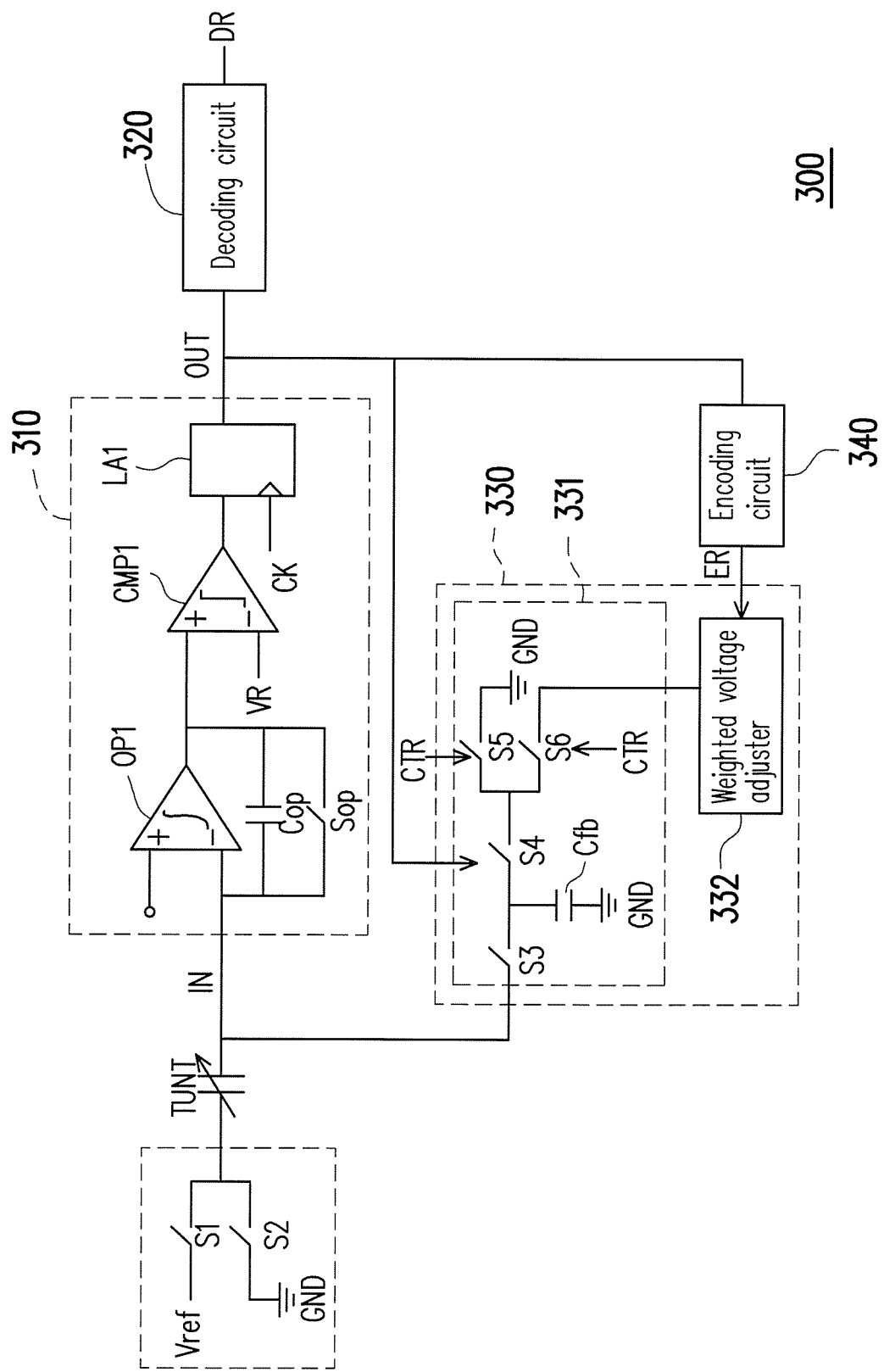
FIG. 3 is a schematic view illustrating a capacitive touch sensing circuit according to still another embodiment of the present invention.

FIG. 3 is a schematic view illustrating a capacitive touch sensing circuit according to still another embodiment of the present invention. The capacitive touch sensing circuit 300 includes a switching capacitor integrating circuit 310, a decoding circuit 320, a feedback circuit 330, and an encoding circuit 340. The feedback circuit 330 provided herein not only receives the output signal OUT but also receives the encoded result ER. Different from the feedback circuit 230 provided in the aforementioned embodiment, the feedback circuit 330 provided herein includes the switching capacitive circuit 331 and a weighted voltage adjuster 332. The switching capacitive circuit 331 includes switches S3-S6 and a capacitor Cfb. One terminal of the switch S3 receives the input signal IN, and the other terminal of the switch S3 is coupled to one terminal of the switch S4. The other terminal of the switch S4 is coupled to a first terminal of the switch S5 and a first terminal of the switch S6, and a second terminal of the switch S5 and a second terminal of the switch S6 are respectively coupled to the reference ground terminal GND and the weighted voltage adjuster 332. The capacitor Cfb is serially connected between the reference ground terminal GND and the terminal where the switches S3 and S4 are coupled to each other.

The weighted voltage adjuster 332 provides a weighted voltage WV to the second terminal of the switch S6 and is able to adjust the weighted voltage WV according to the encoded result ER. Through adjusting the weighted voltage WV, the feedback circuit 330 is able to effectively adjust the charge dissipation ability of the charge dissipation path provided by the feedback circuit 330.

For instance, if 8 different 3-bit hexadecimal encoded results ER (0-7) are provided, the weighted voltage WV can be adjusted within the range 1/8 *Vref–8/8 *Vref. That is, the feedback circuit 330 is able to make 8-phase modifications to the charge dissipation ability of the charge dissipation path.

Certainly, the bit number of the encoded result ER is not limited herein; if it is intended to increase the sensing resolution of variations in the capacitance, the bit number of the encoded result may also be increased. The feedback circuits can also make modifications to the charge dissipation ability of the charge dissipation path in more phases.

Figure 4:
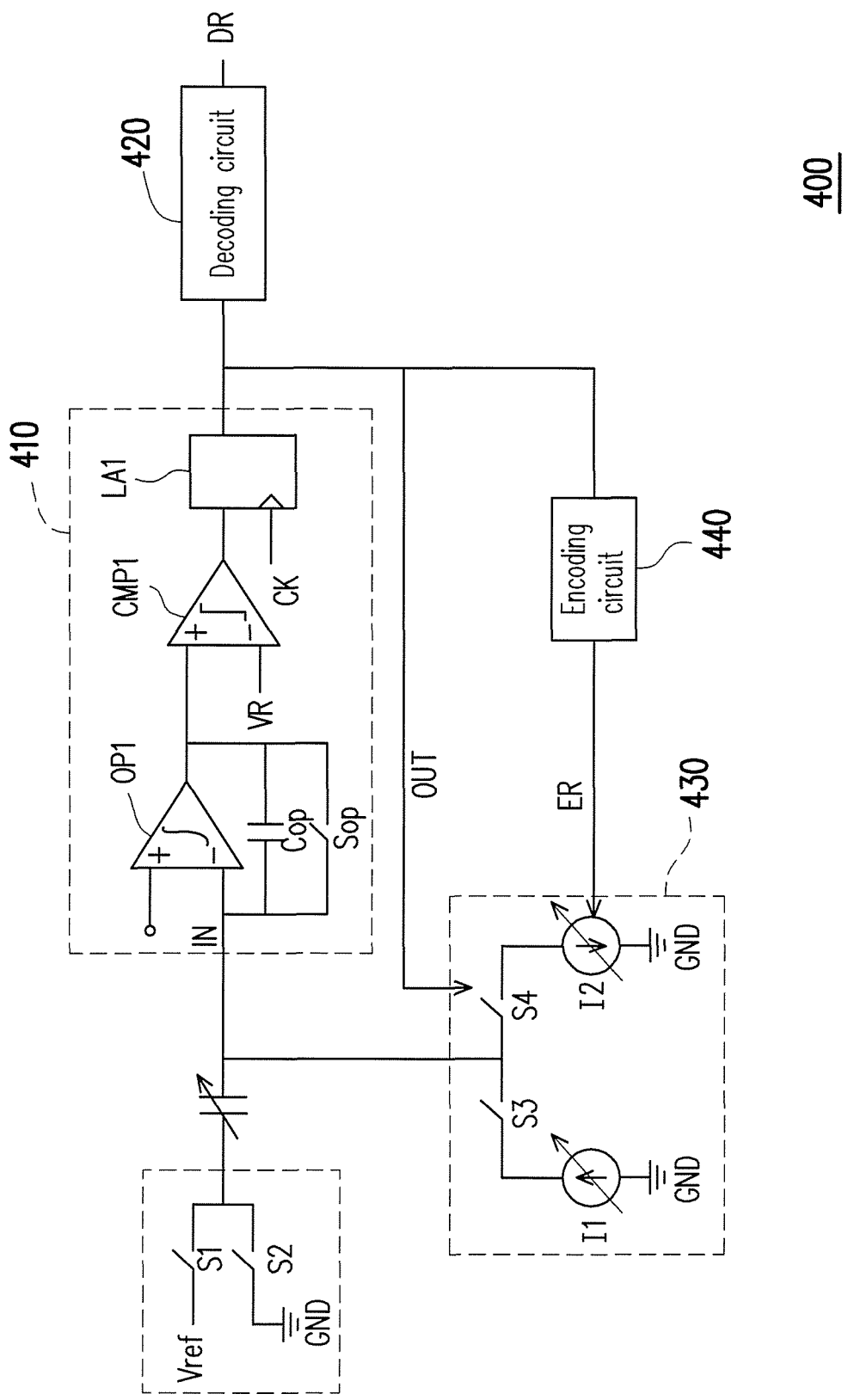
FIG. 4 is a schematic view illustrating a capacitive touch sensing circuit according to still another embodiment of the present invention.

FIG. 4 is a schematic view illustrating a capacitive touch sensing circuit according to another embodiment of the invention. The capacitive touch sensing circuit 400 includes a switching capacitor integrating circuit 410, a decoding circuit 420, a feedback circuit 430, and an encoding circuit 440. Different from the feedback circuits provided in the aforementioned embodiments, the feedback circuit 430 provided herein includes current sources I1 and I2 and switches S3 and S4. A first terminal of the switch S3 and a first terminal of the switch S4 are commonly coupled to an input end point of the switching capacitor integrating circuit 410, and a second terminal of the switch S3 and a second terminal of the switch S4 are respectively coupled to the current sources I1 and I2. Note that the current source I2 drains the current from the switch S4 and transmits the drained current to the reference ground terminal GND.

Note that the switches S3 and S4 are controlled by the output signal OUT, and the current sources I1 and I2 are controlled by the encoded result ER. When the switch S3 is switched on, the switch S4 is switched off, and vice versa. Here, the amount of the current drained from the current sources I1 and I2 or the time frame during which the charges are discharged can be adjusted according to the encoded result ER and the output signal OUT. Thereby, the charge dissipation path provided by the feedback circuit 410 is dynamically adjusted, e.g., the charging/discharging ability of the charging/discharging path may be adjusted.

Figure 5:
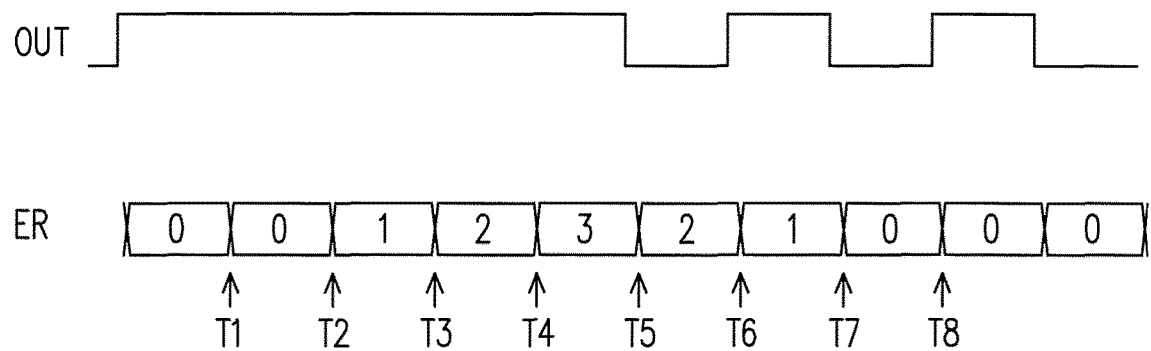
FIG. 5 illustrates waveforms of encoding actions of an encoding circuit according to an embodiment of the present invention.

FIG. 5 illustrates waveforms of encoding actions of an encoding circuit according to an embodiment of the invention. The voltage level of the output signal OUT is periodically detected; at the time point T1 and the time point T2, the output signal OUT has the same logic high level, and the encoding circuit can gradually increase the encoded result ER from 0 to 1 at the time point T2. At the time point T3, the encoding circuit detects that the voltage level of the output signal OUT remains logic high, and thus the encoding circuit gradually increases the encoded result ER from 1 to 2 at the time point T3. At the time point T4, the encoding circuit continues to detect the voltage level of the output signal OUT and finds out that the voltage level of the output signal OUT remains logic high, and thus the encoding circuit gradually increases the encoded result ER from 2 to 3 at the time point T4.

At the time point T5, the encoding circuit detects that the voltage level of the output signal OUT is changed to logic low, and thus the encoding circuit gradually decreases the encoded result ER from 3 to 2 at the time point T4. Similarly, at the time point T6, the encoding circuit detects that the voltage level of the output signal OUT is changed to logic high from logic low; at the time point T7, the encoding circuit detects that the voltage level of the output signal OUT is changed to logic low from logic high. Hence, the encoding circuit gradually decreases the encoded result ER from 2 to 1 at the time point T6 and gradually decreases the encoded result ER from 1 to 0 at the time point T7.

Figure 6:
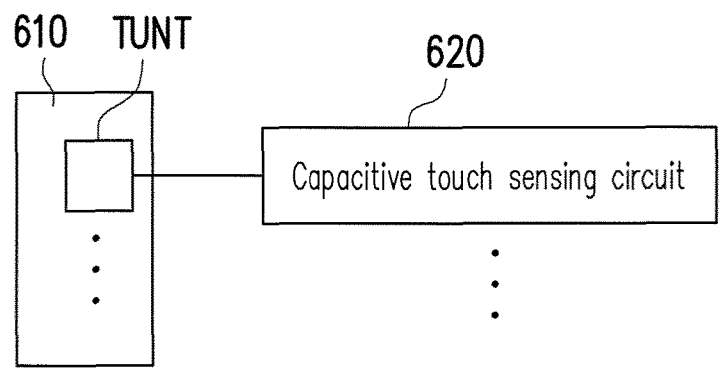
FIG. 6 is a schematic view illustrating a touch apparatus according to an embodiment of the present invention.

FIG. 6 is a schematic view illustrating a touch apparatus according to an embodiment of the present invention. The touch apparatus 600 includes a touch panel 610 and at least one capacitive touch sensing circuit 620, and the touch panel 610 may be a self-capacitive touch panel or a mutual-capacitive touch panel. The touch panel 610 includes a plurality of capacitive touch units, and the to-be-tested capacitive touch unit TUNT of the capacitive touch units is coupled to the capacitive touch sensing circuit 620 to detect variations in the capacitance of the to-be-tested capacitive touch unit TUNT and thereby obtain the touched condition of the to-be-tested capacitive touch unit TLTNT. In the present embodiment, the touch panel 610 may be an in-cell touch display panel. However, in other embodiments, the touch panel 610 may be an out-cell touch panel or any other touch panel capable of performing the touch function.

The capacitive touch sensing circuit 620 may be implemented by any of the capacitive touch sensing circuits 200, 300, and 400 depicted in FIG. 2, FIG. 3, and FIG. 4, and the implementation details of the capacitive touch sensing circuits 200, 300, and 400 are already elaborated in the aforementioned embodiments and therefore will not be provided herein.

Figure 7:
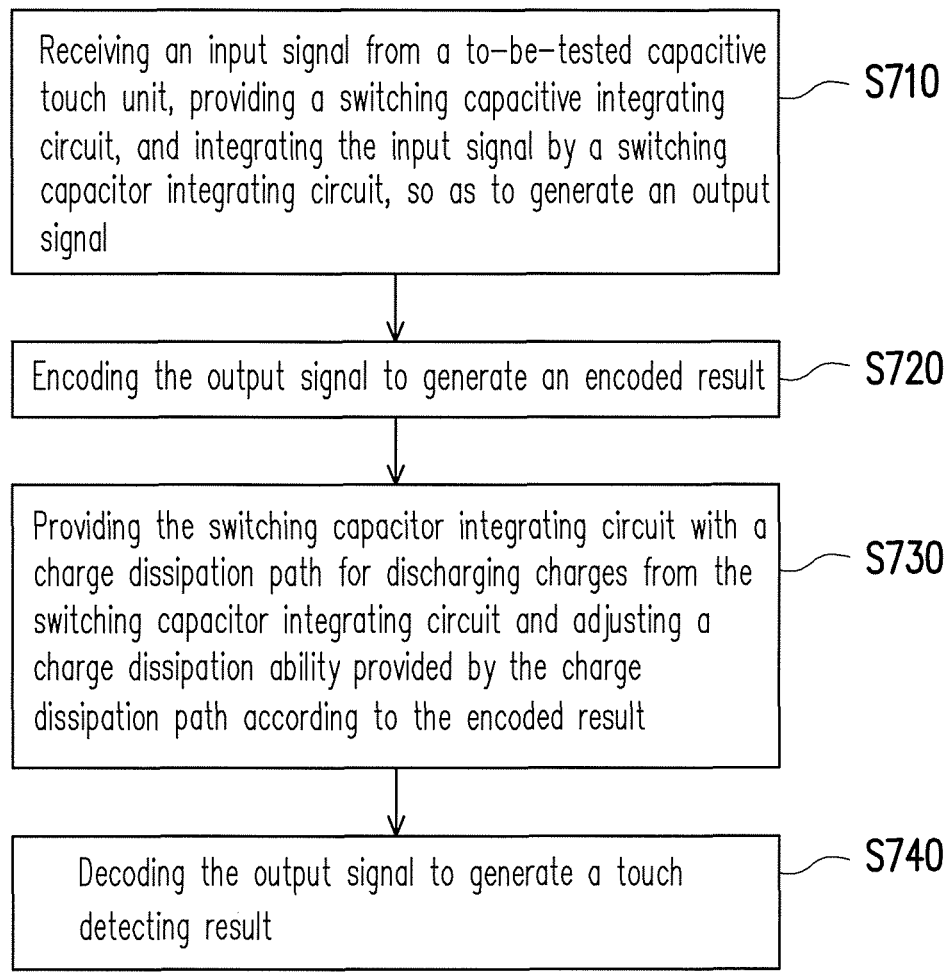
FIG. 7 is a flowchart of a capacitive touch sensing method according to an embodiment of the present invention.

FIG. 7 is a flowchart of a capacitive touch sensing method according to an embodiment of the present invention. In step S710, a to-be-tested capacitive touch unit receives an input signal and provides a switching capacitor integrating circuit to integrate the input signal, so as to generate an output signal; in step S720, the output signal is encoded to generate an encoded result; in step S730, a charge dissipation path is provided to the switching capacitor integrating circuit for discharging charges from the switching capacitor integrating circuit and adjusting a charge dissipation ability provided by the charge dissipation path according to the encoded result; in step S740, the output signal is decoded to generate a touch detecting result.

The implementation details of each step are already elaborated above and thus will not be repeated.

To sum up, the encoding circuit provided herein encodes the output signal, and the encoded result is provided to the feedback circuit. The feedback circuit dynamically adjusts the charge dissipation ability of the charge dissipation path provided by the feedback circuit according to the encoded result; thereby, the capacitive touch sensing circuit need not sacrifice the detectable range of variations in the capacitance for the highly sensing resolution nor sacrifice the resolution for the large detectable range of variations in the capacitance. That is, the capacitive touch sensing circuit provided herein can function while taking the requirements for both the resolution and the detectable range into consideration, and the performance can therefore be enhanced. It will increase the sensitivity of touch apparatus using the capacitive sensing circuit according to the embodiments of the present invention.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A capacitive touch sensing circuit comprising:
    a switching capacitor integrating circuit coupled to a to-be-tested capacitive touch unit receiving an input signal, the switching capacitor integrating circuit integrating the input signal to generate an output signal;
    an encoding circuit coupled to the switching capacitor integrating circuit to receive the output signal and encode the output signal to generate an encoded result;
    a feedback circuit coupled to the switching capacitor integrating circuit and the encoding circuit, the feedback circuit providing the switching capacitor integrating circuit with a charge dissipation path for discharging charges from the switching capacitor integrating circuit, the feedback circuit receiving the encoded result and adjusting a charge dissipation ability provided by the charge dissipation path according to the encoded result; and
    a decoding circuit coupled to the switching capacitor integrating circuit to receive the output signal and decode the output signal to generate a touch detecting result.

2. The capacitive touch sensing circuit as recited in claim 1, wherein the feedback circuit comprises:
    a switching capacitive circuit receiving the output signal, a first terminal of the switching capacitive circuit being coupled to an end point of the switching capacitor integrating circuit receiving the input signal; and
    a weighted voltage adjuster coupled to the encoded circuit and a second terminal of the switching capacitive circuit, the weighted voltage adjuster providing a weighted voltage to the second terminal of the switching capacitive circuit and adjusting the weighted voltage according to the encoded result,
    wherein the charge dissipation path is generated between the first terminal and the second terminal of the switching capacitive circuit.

3. The capacitive touch sensing circuit as recited in claim 2, wherein the switching capacitive circuit comprises:
- a first switch, a first terminal of the first switch being coupled to the end point of the switching capacitor integrating circuit receiving the input signal, the first switch being controlled by the output signal to be switched on or off;
- a capacitor serially connected between a second terminal of the first switch and a reference ground terminal;
- a second switch, a first terminal of the second switch being coupled to the second terminal of the first switch, the second switching being controlled by the output signal to be switched on or off;
- a third switch serially connected between a second terminal of the second switch and the reference ground terminal and controlled by a control signal to be switched on or off; and
- a fourth switch, a first terminal of the fourth switch being coupled to the second terminal of the second switch, a second terminal of the fourth switch receiving the weighted voltage, the fourth switch being controlled by the control signal to be switched on or off.

4. The capacitive touch sensing circuit as recited in claim 1, wherein the feedback circuit comprises:
- a switching capacitive circuit receiving the output signal, a first terminal of the switching capacitive circuit being coupled to an end point of the switching capacitor integrating circuit receiving the input signal, the switching capacitive circuit comprising a weighted capacitance adjuster providing a capacitance, the capacitance being adjusted according to the encoded result,
- wherein a second terminal of the switching capacitive circuit receives a reference voltage, and the charge dissipation path is generated between the first terminal and the second terminal of the switching capacitive circuit.

5. The capacitive touch sensing circuit as recited in claim 4, wherein the feedback circuit further comprises:
- a first switch, a first terminal of the first switch being coupled to the end point of the switching capacitor integrating circuit receiving the input signal, the first switch being controlled by the output signal to be switched on or off;
- a second switch, a first terminal of the second switch being coupled to a second terminal of the first switch, the second switch being controlled by the output signal to be switched on or off;
- a third switch serially connected between a second terminal of the second switch and a reference ground terminal and controlled by a control signal to be switched on or off; and
- a fourth switch, a first terminal of the fourth switch being coupled to the second terminal of the second switch, a second terminal of the fourth switch receiving the reference voltage, the fourth switch being controlled by the control signal to be switched on or off.

6. The capacitive touch sensing circuit as recited in claim 1, wherein the feedback circuit comprises:
- a switch, a first terminal of the switch being coupled to an end point of the switching capacitor integrating circuit receiving the input signal; and
- a current source coupled to a second terminal of the switch, the current source draining a current from the second terminal of the switch and transmitting the current to a reference ground terminal, wherein an amount of the current or a time frame during which the switch is switched on is adjusted according to the encoded result.

7. The capacitive touch sensing circuit as recited in claim 1, wherein the encoding circuit sequentially generates the encoded result in a plurality of time cycles according to variations in a voltage of the output signal in two successive time cycles of the time cycles.

8. The capacitive touch sensing circuit as recited in claim 7, wherein the encoding circuit gradually increases the encoded result when a logic level of the voltage of the output signal in two successive time cycles of the time cycles remains constant, and the encoding circuit gradually decreases the encoded result when the logic level of the voltage of the output signal in one of the two successive time cycles is different from the logic level of the voltage of the output signal in the other of the two successive time cycles.

9. The capacitive touch sensing circuit as recited in claim 1, wherein the decoding circuit sequentially generates a plurality of numeral values in a plurality of time cycles according to variations in a voltage of the output signal in two successive time cycles of the time cycles and obtains the touch detecting result through adding up the numeral values.

10. A touch apparatus comprising:
- a touch panel comprising a plurality of capacitive touch units; and
- at least one capacitive touch sensing circuit as recited in claim 1, the at least one capacitive touch sensing circuit being coupled to the to-be-tested capacitive touch unit of one of the capacitive touch units.

11. A capacitive touch sensing method comprising:
- receiving an input signal, providing a switching capacitor integrating circuit, and integrating the input signal by a switching capacitor integrating circuit, so as to generate an output signal;
- encoding the output signal to generate an encoded result;
- providing the switching capacitor integrating circuit with a charge dissipation path for discharging charges from the switching capacitor integrating circuit and adjusting a charge dissipation ability provided by the charge dissipation path according to the encoded result; and
- decoding the output signal to generate a touch detecting result.

12. The capacitive touch sensing method as recited in claim 11, wherein the step of providing the switching capacitor integrating circuit with the charge dissipation path for discharging the charges from the switching capacitor integrating circuit and adjusting the charge dissipation ability provided by the charge dissipation path according to the encoded result comprises:
- providing a switching capacitive circuit, a first terminal of the switching capacitive circuit being coupled to the switching capacitor integrating circuit; and
- providing a weighted voltage to a second terminal of the switching capacitive circuit and adjusting the weighted voltage according to the encoded result,
- wherein the charge dissipation path is formed between the first terminal and the second terminal of the switching capacitive circuit.

13. The capacitive touch sensing method as recited in claim 11, wherein the step of providing the switching capacitor integrating circuit with the charge dissipation path for discharging the charges from the switching capacitor integrating circuit and adjusting the charge dissipation ability provided by the charge dissipation path according to the encoded result comprises:

providing a switching capacitive circuit, a first terminal of the switching capacitive circuit being coupled to the switching capacitor integrating circuit; and adjusting a capacitance of a variable capacitor in the switching capacitive circuit according to the encoded result, wherein a second terminal of the switching capacitive circuit receives a reference voltage, and the charge dissipation path is formed between the first terminal and the second terminal of the switching capacitive circuit.

14. The capacitive touch sensing method as recited in claim 11, wherein the step of providing the switching capacitor integrating circuit with the charge dissipation path for discharging the charges from the switching capacitor integrating circuit and adjusting the charge dissipation ability provided by the charge dissipation path according to the encoded result comprises:

providing a switch, the switch being coupled between an end point of the switching capacitor integrating circuit receiving the input signal and a current source;

enabling the current source to drain a current from a second terminal of the switch and transmit the current to a reference ground terminal; and adjusting at least one of an amount of the current and a time frame during which the switch is switched on according to the encoded result.

15. The capacitive touch sensing method as recited in claim 11, wherein the step of encoding the output signal to generate the encoded result comprises:

sequentially generating the encoded result in a plurality of time cycles according to variations in a voltage of the output signal in two successive time cycles of the time cycles.

16. The capacitive touch sensing method as recited in claim 15, wherein the step of sequentially generating the encoded result in the time cycles according to the variations in the voltage of the output signal in the two successive time cycles comprises:

gradually increasing the encoded result when a logic level of the voltage of the output signal in the two successive time cycles remains constant; and gradually decreasing the encoded result when the logic level of the voltage of the output signal in one of the two successive time cycles is different from the logic level of the voltage of the output signal in the other of the two successive time cycles.

17. The capacitive touch sensing method as recited in claim 11, wherein the step of decoding the output signal to generate the touch detecting result comprises:

sequentially generating a plurality of numeral values in a plurality of time cycles according to variations in a voltage of the output signal in two successive time cycles of the time cycles; and adding up the numeral values to obtain the touch detecting result.

* * * * *